United States Patent
Verma et al.

(10) Patent No.: US 8,689,110 B2
(45) Date of Patent: Apr. 1, 2014

(54) MULTI-CHANNEL USER INTERFACE ARCHITECTURE

(75) Inventors: Manish Verma, Cupertino, CA (US); George Colliat, Emerals Hills, CA (US); Jean Christophe Meriaux, San Bruno, CA (US); Pulak Das, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 719 days.

(21) Appl. No.: 12/756,670

(22) Filed: Apr. 8, 2010

(65) Prior Publication Data

US 2011/0252334 A1    Oct. 13, 2011

(51) Int. Cl.
*G06F 3/01*    (2006.01)

(52) U.S. Cl.
USPC ............. 715/744; 715/746; 715/968; 705/16

(58) Field of Classification Search
USPC .............................. 715/744, 746, 968; 705/16
See application file for complete search history.

(56) References Cited

U.S. PATENT DOCUMENTS

| | | | |
|---|---|---|---|
| 2003/0172007 A1 | 9/2003 | Helmolt et al. | |
| 2004/0128342 A1* | 7/2004 | Maes et al. | 709/200 |
| 2007/0094076 A1 | 4/2007 | Perkowski et al. | |
| 2009/0006114 A1 | 1/2009 | Donovan et al. | |
| 2010/0169776 A1* | 7/2010 | Sankar et al. | 715/716 |

OTHER PUBLICATIONS

MachSoftware, "Mach Software System Overview", http://www.machsoftware.com/mach-order-management-software/system-overview.aspx.
EPICOR, "Cross-Channel Order Management", http://www.epicor.com/solutions/pages/cross-channelordermanagement.aspx.
Sigma Micro, "Sigma Commerce", http://www.sigma-micro.com/commerce/.
HCL, "Multi-Channel Order Management Services for Retailers", http://www.hclbpo.com/pdf/brochures/retail/Multi-Channel%20Order%20Management%20Services%20for%20Retailers.pdf.
Sterling Commerce, "Sterling Multi-Channel Fulfillment", http://www.sterlingcommerce.com/products/multi-channel-fulfillment/.
NetSuite Inc., "NetSuite Multi-Channel Retail Management Suite; Netsuite for Multi-Channel Retailers", http://www.netsuite.com/portal/industries/retail.shtml.
NetSuite Inc., "Retail; Netsuite for Retail Companies", http://www.netsuite.com/portal/industries/retail/benefits.shtml.
NetSuite Inc., "Suiteflex; The Ultimate Platform for Business Process Customization & Verticalization", http://www.netsuite.com/portal/products/netsuite/suiteflex/main.shtml.

(Continued)

*Primary Examiner* — Andrea Leggett
(74) *Attorney, Agent, or Firm* — Miles & Stockbridge P.C.

(57) ABSTRACT

A computer-readable medium, computer-implemented method, and multi-channel user interface system are provided. In one embodiment, a computer-readable medium has instructions stored thereon that, when executed by a processor, cause the processor to perform a method. The instructions include providing source code and metadata for a base set of user interfaces, where the base set of user interfaces is capable of being executed on multiple channel. The metadata is capable of configuration for a specific channel. The configuration of metadata for a specific channel includes projecting one or more task flows from a task flow template and configuring one or more regions for each task flow.

17 Claims, 18 Drawing Sheets

(56) References Cited

OTHER PUBLICATIONS

NetSuite Inc., "Suiteflex; The Ultimate Platform for Business Process Customization", www.netsuite.com/portal/pdf/ds-netsuite.pdf.

OrderMotion Inc., "Shipping Software; TrueShip", http://www.trueship.com/partners/ordermotion.

OrderMotion Inc., "OMX for E-Commerce", http://www.ordermotion.com/Ecommerce/OMXEcommerce/.

OrderMotion Inc., "E-Commerce Features and Tools", http://www.ordermotion.com/Ecommerce/EcommerceFeaures/.

Oracle, Oracle ADF 11g Primer; "Introduction to the building blocks of a Fusion Web application", An Oracle White Paper, Apr. 2007, http://www.oracle.com/technology/products/jdev/11/how-tos/oracle%20adf%2011g%20primer.pdf.

\* cited by examiner

Fig. 3

| Actions ˅ | View ˅ | ☒ ✗ | Configure | | | | | | | | |
|---|---|---|---|---|---|---|---|---|---|---|---|
| Line No | Line Type | Product No | Product | Product Image | Qty | UOM | Asset | Unit Net Price | Total Net Price | Status | Alert |
| 1 | Sell | DL-D630 | D630 Desktop Computer<br>Remove ✦<br>Add to Compare ✦ | | 1 | Each ˅ | | 399.00 USD | 399.00 USD | Available to Pick | |
| 2 | Sell | DL-KB-203 | Deluxe Ergo Keyboard<br>Remove ✦<br>Add to Compare ✦ | | 1 | Each ˅ | | 179.99 USD | 10.00 USD | Available to Pick | |
| | | | | | | | | Subtotal | 409.00 USD | | |
| | | | | | | | | Tax | 00.00 USD | | |
| | | | | | | | | Total | 409.00 USD | | |

MULTI-CHANNEL USER INTERFACE ARCHITECTURE

FIELD

One embodiment is directed generally to a computer system, and in particular to computer systems utilizing a user interface.

BACKGROUND

In commerce, a vendor generally has multiple channels of commerce which a customer can utilize in order to purchase a product from a vendor. For example, the customer may purchase a product from the vendor directly from a store of a vendor (i.e., point-of-service or "POS"). As another example, the customer may purchase the product from the vendor via the Internet, using an Internet browser, or mobile phone, to access the vendor's website. As yet another example, the customer may call into the vendor's call center and purchase the product via telephone. Finally, the customer may purchase the product through a third-party kiosk, such as an airport kiosk.

In order to utilize each channel, the vendor can create user interfaces ("UIs") for each channel. For example, the vendor can create an order capture user interface configured to receive and process a customer's order. As an example, the vendor can create a user interface for a POS channel, an Internet channel, a call center channel, and a kiosk channel.

However, a user interface may have different requirements in one channel compared to another channel. For example, an order capture user interface for a POS channel may not be required to capture a customer's shipping information since the vendor will not be required to ship the product to the customer. In contrast, an order capture user interface for an Internet channel may be required to capture the customer's shipping information, as part of processing the order may include shipping the product to the customer, so that the customer does not need to come in to the vendor's store. Similar differences may arise in order capture user interfaces for a call center channel, and a kiosk channel.

The different user interface requirements generally result in a vendor creating a separate user interface for each channel. As source code for a POS channel user interface is different from source code for an Internet channel user interface, a vendor is forced to develop and maintain multiple bodies of source code for its different user interfaces.

SUMMARY

One embodiment is directed to a computer-readable medium having instructions stored thereon that, when executed by a processor, cause the processor to perform a method. The instructions include providing source code and metadata for a base set of user interfaces, where the base set of user interfaces is capable of being executed on multiple channels. The metadata is capable of configuration for a specific channel. The configuration of metadata for a specific channel includes projecting one or more task flows from a task flow template and configuring one or more regions for each task flow.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates a channel-specific user interface of FIG. 2 according to an embodiment of the invention.

FIG. 12 illustrates a region of FIG. 11 according to an embodiment of the invention.

DETAILED DESCRIPTION

As discussed above, a vendor that has multiple channels of commerce generally creates a separate user interface for each channel. This causes the following problems. First, the vendor must develop and maintain source code for multiple user interfaces. This results in duplicative coding, configuration, and maintenance, which means increased costs to the vendor. Second, because of the increased costs involved in duplicative coding, when the vendor develops new features for its user interfaces, the vendor generally does not include the new features in all of its user interfaces, but instead only includes the new features in preferred user interfaces. This results in feature gaps between user interfaces. Because of feature gaps, a customer may be required to use a particular channel in order to utilize a desired feature of the user interface, limiting the channel options of the customer. This limiting of channel options results in customer dissatisfaction, as customers may not be able to use their preferred channels to conduct business transactions with the vendor.

According to one embodiment of the invention, a new computer-readable medium, computer-implemented method, and system can provide a single set of base user interfaces, where each base user interface can be configured for a specific channel. The set of base user interfaces is applicable to any channel. After an application which includes the set of base user interfaces has been deployed, each base user interface can be configured, at runtime, for a specific channel.

Customization and configuration are distinct concepts, and thus are defined differently, consistent with the knowledge of one of ordinary skill in the art. Customization is generally defined as the modification of an application by modifying the source code of the application which generates corresponding metadata files. For example, a user interface of an application can be customized via an application development tool configured to modify the user interface source code, such as JDeveloper. Configuration is generally defined as the modification of an application by modifying one or more metadata files generated by the source code of the application. In configuration, the source code of the application is not modified. For example, a use interface of an application can be customized via a browser-based tool, also known as a Software-as-a-Service ("SaaS") tool, or Design-Time at Runtime (DT@RT) tool. Thus, in configuration, minimal application development skills are required, as configuration is enabled through the SaaS tool or DT@RT tool. Both customization and configuration can include modifications to a flow, region, navigation, page layout (i.e., positioning of regions), component, component attribute, skin, menu, header and footer, and security attribute.

Figure 1:
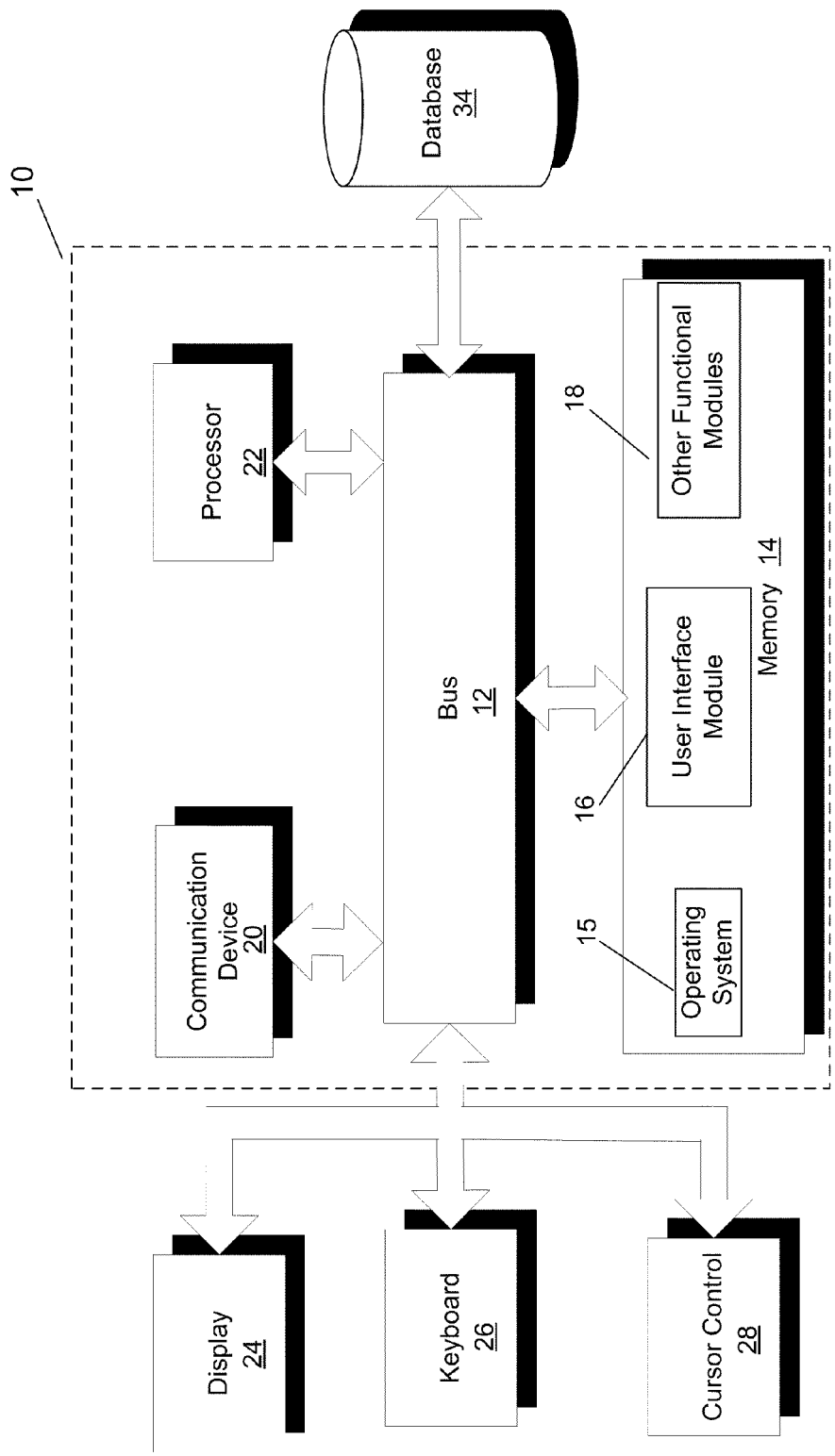
FIG. 1 illustrates a block diagram of a system that may implement an embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. Computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a user interface module 16, as well as other functional modules 18. Operating system 15 can provide an operating system functionality for system 10. User interface module 16 can provide functionality for customizing and configuring a user interface, as will be described in more detail below. System 10 can also be part of a larger system. Thus, system 10 can include one or more additional functional modules 18 to include the additional functionality. For example, functional modules 18 may include modules that are part of the "Fusion" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
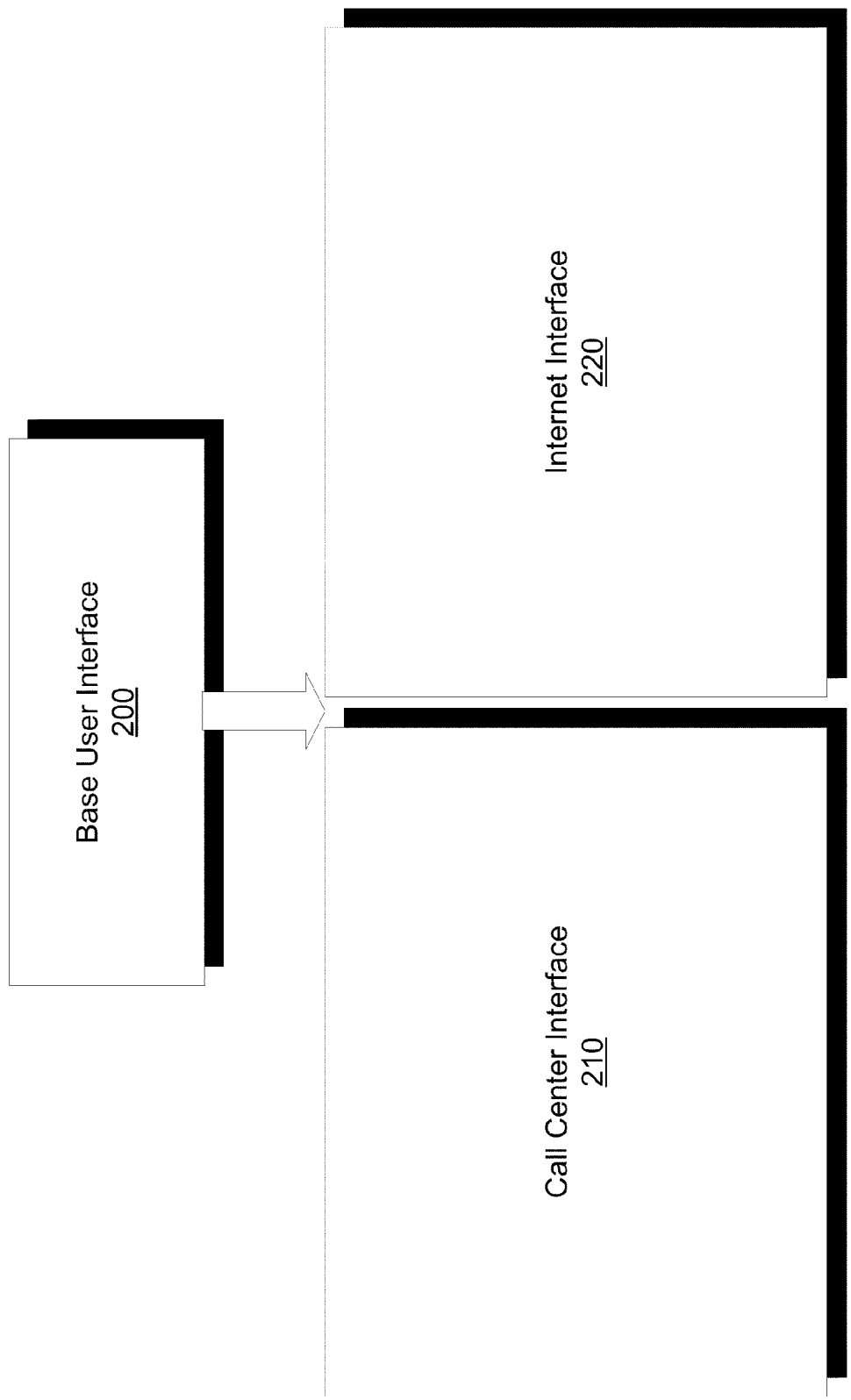
FIG. 2 illustrates an example of a base user interface and two channel-specific user interfaces configured from the base user interface according to an embodiment of the invention.

FIG. 2 illustrates an example of a base user interface and two channel-specific user interfaces configured from the base user interface according to an embodiment of the invention. FIG. 2 includes base user interface 200 which represents source code developed by a vendor for a user interface, where the source code is capable of being used over multiple channels of commerce. However, according to the embodiment, base user interface 200 is not implemented in any specific channel. Instead, base user interface 200 can be configured for a specific channel, so that a specific user interface can be utilized within that channel. In the illustrated embodiment, base user interface 200 is a user interface for an order capture product. However, this is merely an example user interface, and base user interface 200 may be a user interface for any kind of product and still be within the scope of the invention.

In the illustrated embodiment in FIG. 2, base user interface 200 is configured for a call center channel, resulting in call center user interface 210. Furthermore, in FIG. 2, base user interface 200 is also configured for an Internet channel, resulting in Internet user interface 220. Call center user interface 210 and Internet user interface 220 are each based on base user interface 200, and include the same source code as base user interface 200. However, call center user interface 210 and Internet user interface 220 are each configured based on channel-specific requirements.

Figure 3:
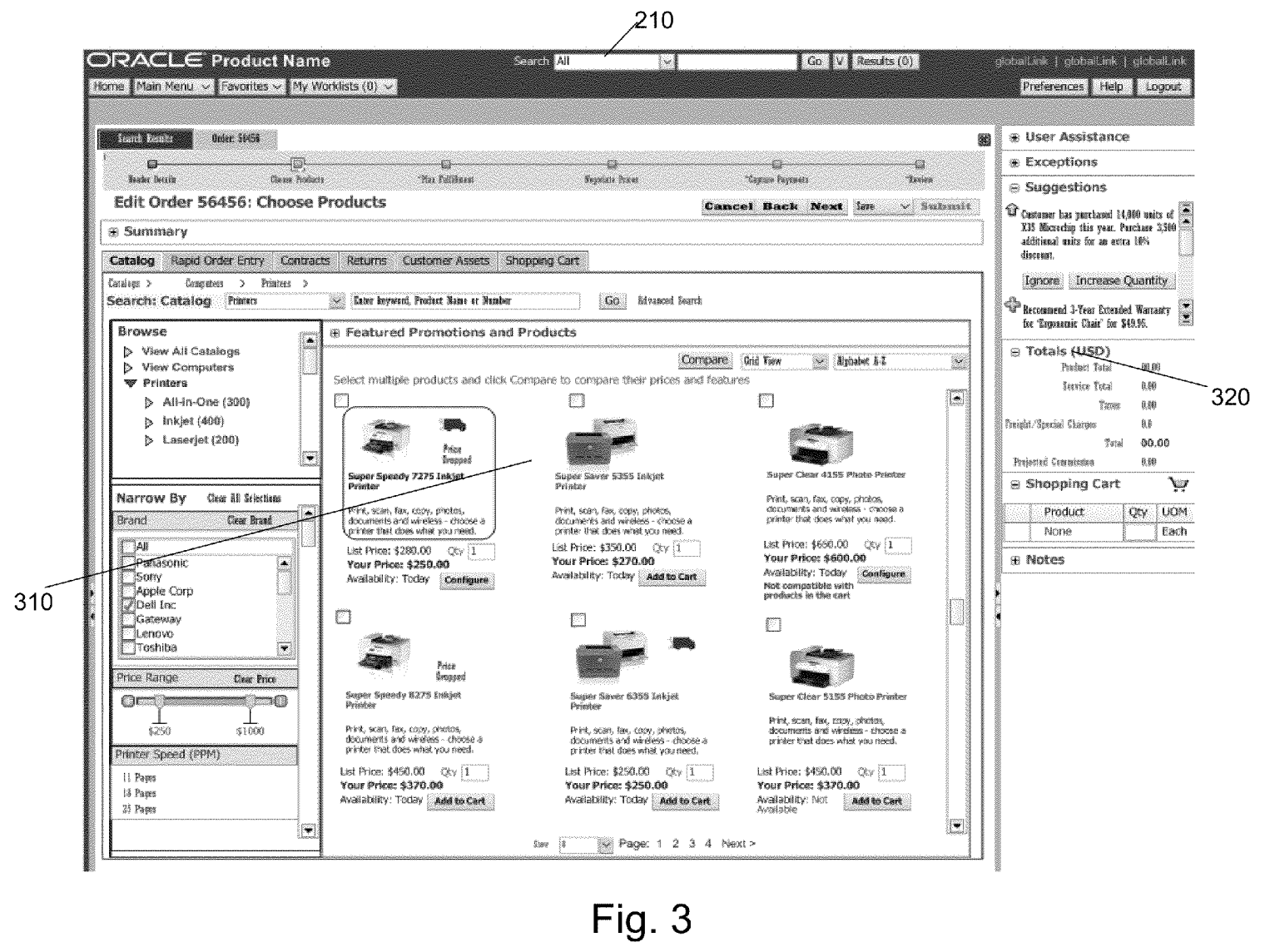
Figure 4:
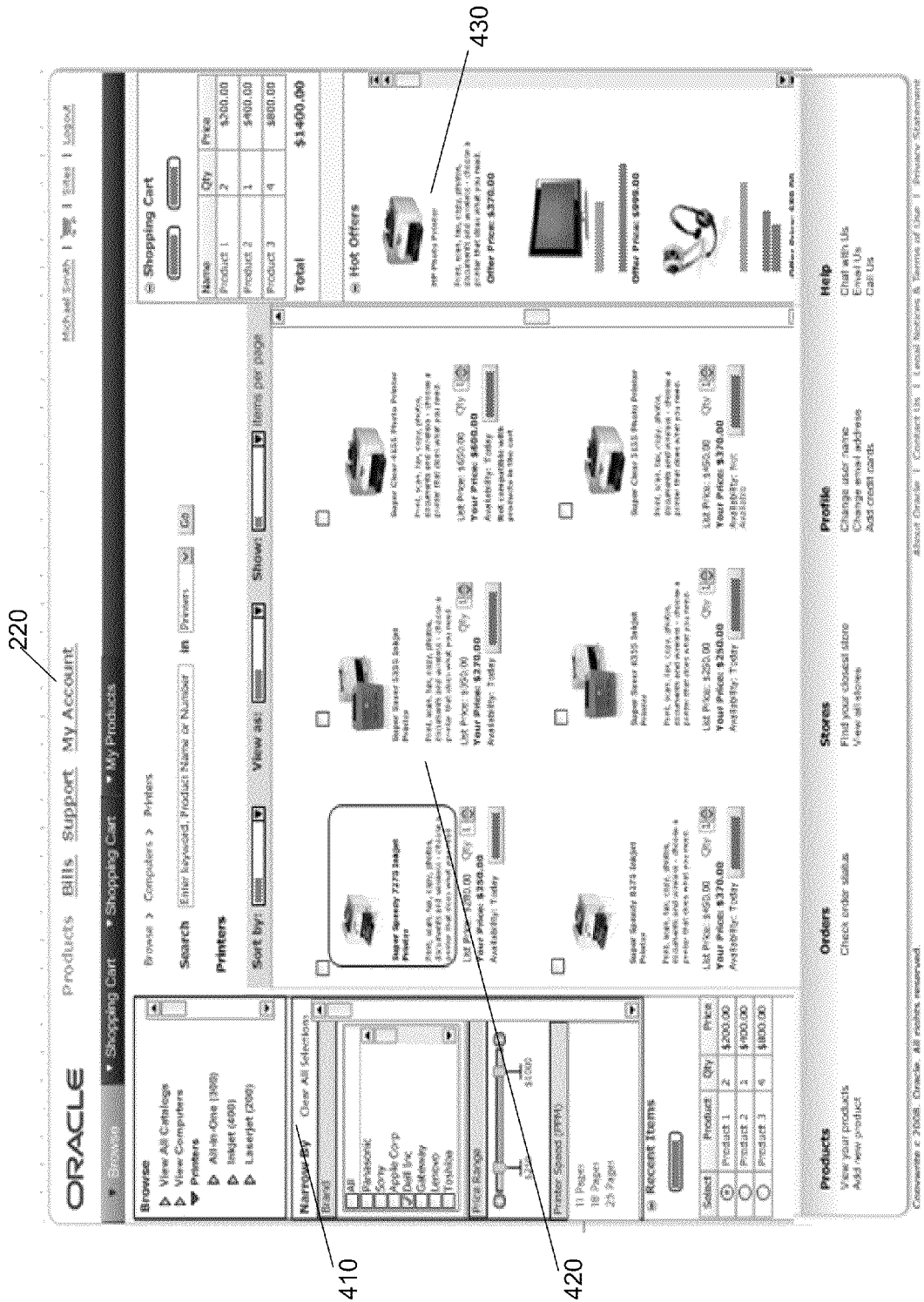
FIG. 4 illustrates another channel-specific user interface of FIG. 2 according to an embodiment of the invention.

FIG. 3 illustrates call center user interface 210 of FIG. 2, and FIG. 4 illustrates Internet user interface 220 of FIG. 2, according to an embodiment of the invention. In the illustrated embodiment of FIGS. 2-4, call center user interface 210 and Internet user interface 220 are each a user interface for an order capture product. However, as can be seen in FIGS. 3 and 4, while call center user interface 210 and Internet user interface 220 are each configured to allow a customer to purchase a product from a vendor, call center user interface 210 and Internet user interface 220 have significantly different appearances. For example, as illustrated in FIG. 3, call center user interface 210 includes two data regions, data regions 310 and 320. In contrast, as illustrated in FIG. 4, Internet user interface 220 includes three data regions, data regions 410, 420, and 430. Further differences in appearance will be discussed below in more detail. As will also be described in more detail below, call center user interface 210 and Internet user interface 220 can have significantly different task flows as well. Thus, a user of call center user interface 210 may be able to view different pages than a user of Internet user interface 220, or visa-versa. Alternatively, while the pages for each user interface may be the same, the pages may be displayed in a different order in call center user interface 210, as compared to Internet user interface 220.

As will be discussed in more detail, embodiments of the invention are not limited to a call center channel or an Internet channel as illustrated in FIGS. 2-4. In contrast, base user interface 200 can be configured for any specific channel. Thus, a vendor can implement a base user interface over multiple channels and avoid code duplication.

Figure 5:
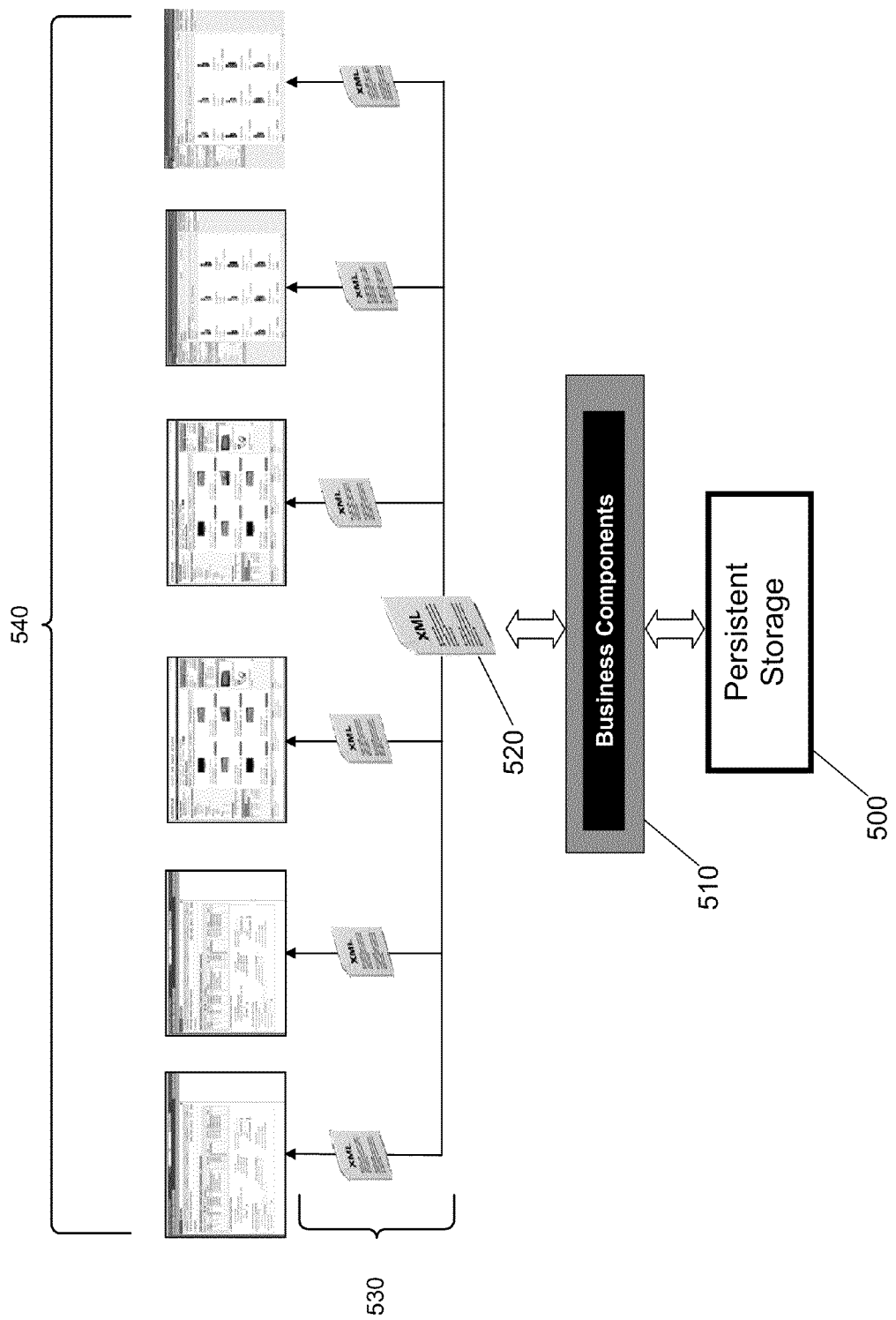
FIG. 5 illustrates a framework for configuring channel-specific user interfaces according to an embodiment of the invention.

FIG. 5 illustrates a framework for configuring channel-specific user interfaces according to an embodiment of the invention. In the embodiment, the framework is based on the Model-View-Controller ("MVC") design pattern. According to the MVC design pattern, an application is separated into three layers: (1) a model layer; (2) a view layer; and (3) a controller layer.

The model layer handles interactions with a data source and runs the business logic in the application. A data source can be any kind of persistent data storage, such as a database, or a computer file. If the data source is a database, the database can be an operational database, an analytical database, a data warehouse, a distributed database, an end-user database, an external database, a navigational database, an in-memory database, a document-oriented database, a real-time database, a relational database, an object-oriented database, or any other database known in the art. If the data source is a computer file, the computer file is any block of arbitrary information, or resource for storing information, which is available to a computer program, that is known in the art. Thus the model layer represents a set of application data values and application business logic.

The view layer handles the user interface portion of the application. The view layer controls the appearance and layout of the user interface, and further controls how a user interacts with the application. The view layer can be implemented in an application (i.e., "thick client"), or implemented in an Internet browser (i.e., "thin client").

The controller layer manages the application flow and acts as an interface between the model layer and the view layer. The controller layer controls a user's navigation of the application.

In certain frameworks, the model layer can be split into two layers; the business services layer and the model layer. Like the model layer in the three-layer framework, the business services layer of the four-layer framework handles interactions with a data source and runs the business logic in the application. The model layer of the four-layer framework provides an abstraction layer on top of the business services layer, enabling the view layer and controller layer to interface with different implementations of business services in a consistent way. If implemented this way, the view layer and the controller layer do not know (and do not need to know) the specific implementations of the various business services.

According to an embodiment, the framework illustrated in FIG. 5 includes persistent storage 500. Persistent storage 500 represents a persistence layer of the framework which persistently stores application data in a non-volatile storage. Persistent storage 500 can include a database or a file. The database can be an operational database, an analytical database, a data warehouse, a distributed database, an end-user database, an external database, a navigational database, an in-memory database, a document-oriented database, a real-time database, a relational database, an object-oriented database, or any other database known in the art. The file can be any block of arbitrary information, or resource for storing information, which is available to a computer program, that is known in the art.

In the embodiment, the framework also includes business components 510. Business components 510 represents the model layer of the framework, as described above in relation to the Model-View-Controller design pattern. Business components 510 includes one or more business services which implement business logic for an application developed using the framework, and which control the application's access to persistent storage 500. Such access can include connecting to persistent storage 500, accessing data from persistent storage 500, locking records of persistent storage 500, and managing transaction with persistent storage 500.

In the embodiment, business components 510 includes business service components. Business service components provide objects, procedures, and functions which can be used to represent data records from persistent storage 500. Business service components facilitate querying, inserting, updating, and deleting data from persistent storage 500 while enforcing appropriate business rules.

In the embodiment, the framework also includes base user interface 520. Base user interface 520 represents source code for a user interface component of an application applicable for all channels. Base user interface 520 can be developed by any application development tool known in the art. An example of such an application development tool is JDeveloper.

In the illustrated embodiment, base user interface 520 is represented in FIG. 5 as an XML file. Base user interface 520 is represented as an XML file, because configuration can be accomplished by modifying metadata of base use interface 520, where the metadata can take the form of one or more XML files, as will be discussed below in more detail. However, while source code for base user interface 520 may include one or more XML files, one of ordinary skill in the art would readily appreciate that source code for base user interface 520 may include other types of files as well. For example, base user interface 520 may include servlets, JavaServer Pages ("JSP"), Enterprise JavaBeans, HTML, CGI scripts, and other application server files known to one of ordinary skill in the art. Furthermore, in certain embodiments, base user interface 520 may include multiple user interfaces, rather than a single user interface.

In the embodiment, the framework also includes a set of channel-specific user interfaces 530. Each channel-specific user interface 530 is based on base user interface 520, and is configured for a specific channel. For each channel-specific user interface 530, the metadata of base user interface 520 is configured according to channel-specific requirements. The metadata of base user interface 520 can be configured via a SaaS tool such as a DT@RT tool. Thus, configuration of base user interface 520 does not generally modify the source code of base user interface 520.

In the illustrated embodiment, each channel-specific user interface 530 is represented in FIG. 5 as an XML file. This is because in each channel-specific user interface 530, the metadata, which can take the form of one or more XML files, has been configured according to channel-specific requirements. However, each channel-specific user interface includes the source code of base user interface 520. As described above, the source code may include other types of files besides XML files.

In the embodiment, the framework also includes a set of channel-specific user interface instances 540. Each channel-specific user interface instance 540 is an instance of a user interface generated from a corresponding channel-specific user interface 530. As can be seen in FIG. 5, while each channel-specific user interface instance 540 is generated from the same base user interface 520, each channel-specific user interface instance 540 has a different overall appearance. The differences in appearances flow from the different metadata configurations in each channel-specific user interface 530.

In the illustrated embodiment, there are three different layers of metadata configurations, in relation to channel-specific user interfaces 530. The first layer is region configuration. Region configuration relates to the appearance and functionality of each page of the user interface. For example, region configuration can include configuring the display of artifacts, such as entity objects, view objects, and application modules, for each page of the user interface. Region configuration can also include configuring which components (such as input fields, drop-down fields, and buttons), and which component attributes are included in each page of the user interface. Region configuration can also include configuring a user's navigation, the positioning of regions, and an overall appearance of each page of the user interface.

The second layer is flow configuration. Flow configuration relates to how the different pages of the user interface are tied together, through the configuration of a flow of the user interface. For example, flow configuration can include configuring a sequence of a task flow for a user interface, hiding a process step so that it is not performed by the user interface, splitting a process step into two separate steps, and merging two separate process steps into one process step. Furthermore, flow configuration can include exposing a train component for a whole process flow or a part of a process flow. A train component is an indication of a number of steps in a multistep process, and an indication of a current step in relation to the entire process.

The third layer is application configuration. Application configuration relates to an overall appearance of the entire user interface, as opposed to a specific page of the user interface. For example, application configuration can include configuring an appearance of a header or footer, configuring a menu, configuring security permissions, or configuring a "skin," or overall appearance, which applies to all pages of a user interface.

In certain embodiments, the framework described above may include one of the following frameworks: Oracle Application Development Framework ("ADF"), Java Enterprise Edition ("EE"), XForms, Microsoft Foundation Class Library, Java Swing, Adobe Flex, Wavemaker, Windows Presentation Foundation, PureMVC, JavaServer Faces ("JSF"), Apache Struts, Tapestry, Wavemaker, SproutCore, Informix 4GL, ASP .NET MVC Framework, Catalyst, Agavi, or any other MVC framework known in the art.

In an embodiment where the framework described above comprises the Oracle ADF, the business services layer may comprise Enterprise JavaBeans ("EJB"), Web Services, JavaBeans, TopLink objects, Business Process Execution Language ("BPEL"), ADF Business Components, Extensible Markup Language ("XML"), or any other business component known in the art. In the Oracle ADF embodiment, the model layer may comprise the ADF model layer. In the Oracle ADF embodiment, the controller layer may comprise ADF Controller, JSF Controller, or Apache Struts. In the Oracle ADF embodiment, the view layer may comprise ADF Faces, JSF, Hyper Text Markup Language ("HTML"), XML, JSP, Apache MyFaces Trinidad, Java Swing, ADF Swing, ADF Mobile, and Microsoft Excel.

Figure 6:
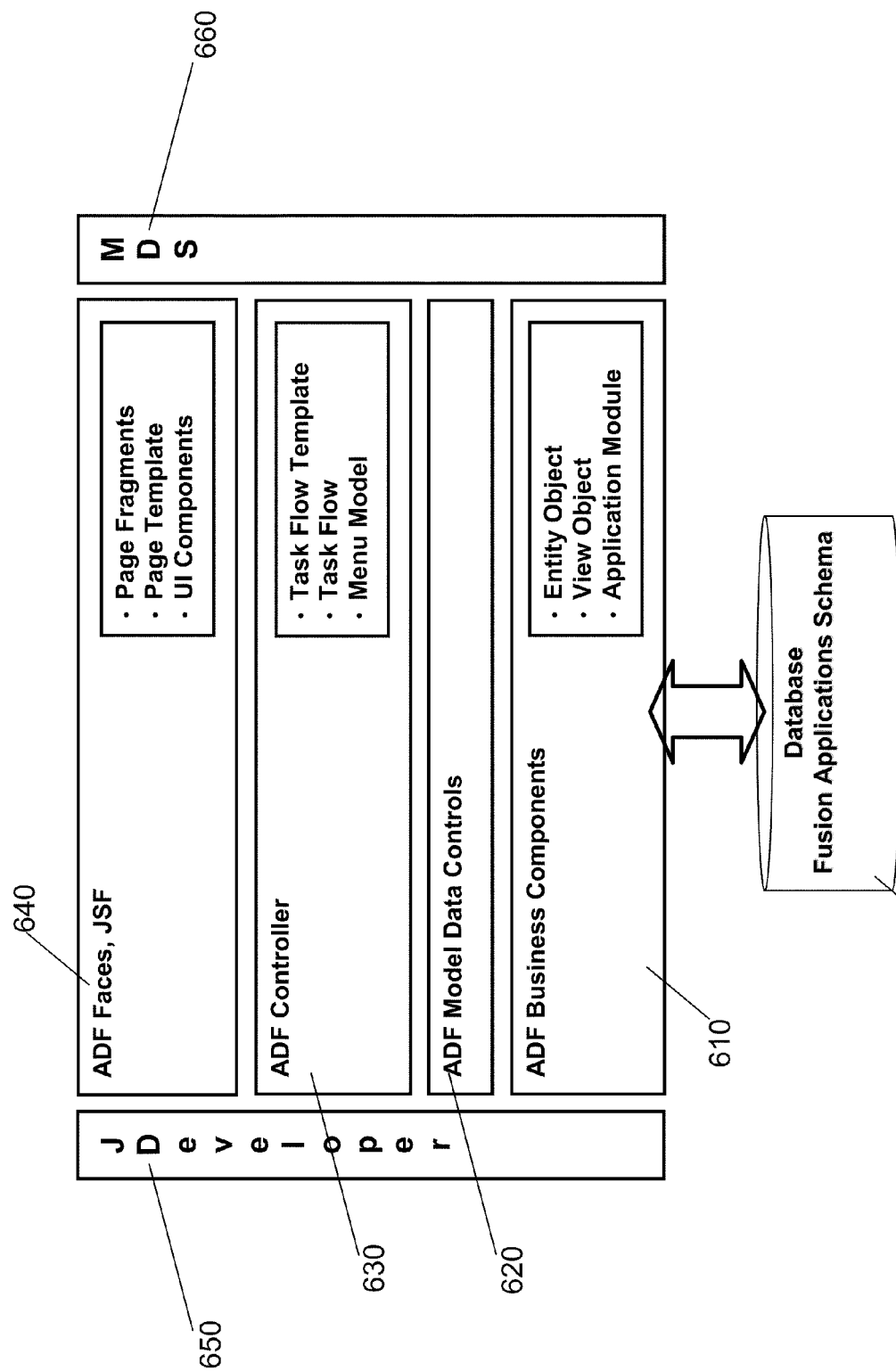
FIG. 6 illustrates a framework implementation for configuring channel-specific user interfaces according to an embodiment of the invention.

FIG. 6 illustrates a framework implementation for configuring channel-specific user interfaces according to an embodiment of the invention. In the illustrated embodiment, the framework described in relation to FIG. 5 is implemented using the Oracle ADF. However, one of ordinary skill in the art would readily appreciate that the illustrated embodiment is an example implementation, and that the framework described in relation to FIG. 5 can be implemented in many different ways and still be within the scope of the invention.

As described above, the framework is based on the MVC design pattern. In the illustrated embodiment, the ADF is based on a four-layer version of the MVC design pattern (i.e., business services layer, model layer, controller layer, and view layer). Each layer of the MVC design pattern is represented in FIG. 6, as will be discussed in more detail.

In the illustrated embodiment, the framework implementation includes Database Fusion Applications Schema 600. Database Fusion Applications Schema 600 represents a structure of a database system. Thus, Database Fusion Applications Schema 600 is a database implementation of a persistence layer of the framework, where a database is used to persist application data used in the framework implementation.

The framework implementation also includes ADF Business Components 610. ADF Business Components 610 provide application objects for querying, inserting, updating and deleting data from Database Fusion Application Schema 600 while enforcing appropriate business rules. ADF Business Components 610 provides an interface between Database Fusion Application Schema 600 and the other layers of the ADF. The business services layer of the four-layer MVC design pattern is implemented by ADF Business Components 610.

ADF Business Components 610 can include entity objects, view objects, and application modules (illustrated in FIG. 6). An entity object represents a logical unit in persistent storage 500 (such as a row of a database table, or a record of a computer file). A view object represents a query of persistent storage 500 (such as a Structured Query Language ("SQL") query when persistent storage 500 includes a database). An application module represents a transactional component that a client can use to work with application data. The application module can define an updateable data model along with top-level procedures and functions related to a logical unit of work related to a task desired by a user.

The framework implementation also includes ADF Model Data Controls 620. ADF Model Data Controls 620 abstracts the implementation of a business service by ADF Business Components 610 by using standard metadata interfaces to describe the services' operations and data collections, including information about the properties, methods, and types involved. ADF Model Data Controls 620 also abstracts the details of accessing data from data collections and of invoking data collections' operations. Thus, ADF Model Data Controls 620 binds components of the user interface to data of Database Fusion Applications Schema 600. The model layer of the four-layer MVC design pattern is implemented by ADF Model Data Controls 620.

The framework implementation also includes ADF Controller 630. ADF Controller 630 handles page flow of an application by providing a navigation and state management model. The controller layer of the four-layer MVC design pattern is implemented by ADF Controller 630.

The navigation and state management model is based on defined sets of control flow rules, also identified as task flows (illustrated in FIG. 6). A task flow represents a collection of portions of an application's navigational graph, and can be used to control the navigation of an application. ADF Controller 630 provides two kinds of task flows: an unbounded task flow and an bounded task flow. An unbounded task flow is a set of activities, control flow rules, and managed beans that interact to allow a user to complete a task. A bounded task flow is a specialized form of task flow that, in contrast to an unbounded task flow, has one single entry point, and zero or more extra points. A bounded task flow contains its own set of private control flow rules, activities, and managed beans. A bounded task flow can be used to form a region, which will be described below in more detail. Any activities and control flows in an application that are not included within a bounded task flow are unbounded task flows.

ADF Controller 630 also includes task flow templates (illustrated in FIG. 6). A task flow template is a starting point for creating new bounded task flows, and similar to a task flow, can be used to control the navigation of an application. The task flow template includes a set of activities, control flows, managed bean definitions, and input parameters, similar to a task flow. However, a task flow template may be extended to create new bounded task flows or new task flow templates. Any changes to a task flow template may be automatically propagated to any task flow or task flow template based on the task flow template.

ADF Controller also includes menu models (illustrated in FIG. 6). Similar to a task flow and a task flow template, a menu model can be used to control the navigation of an application. A menu model is a special kind of collection of rows indexed by row keys that is stored in one or more metadata files. The menu model represents a navigation menu for a page hierarchy. Each node in the hierarchy represent a page of the application.

The framework implementation also includes ADF Faces 640, which is based on JSF. ADF Faces 640 includes a set of JSF components that include built-in Asynchronous JavaScript and XML ("AJAX") functionality. AJAX is a combination of asynchronous JavaScript, dynamic HTML ("DHTML"), XML and a XmlHttpRequest communication channel. The JSF components provide an application programming interface ("API") for representing UI components and managing states of the UI components, handling events, server-side validating of user input, and defining page navigation. The view layer of the four-layer MVC design pattern is implemented by ADF Faces 640.

ADF Faces 640 include page fragments (identified in FIG. 6). A page fragment is a portion of a page of a user interface, such as a JSF page. A complex page can be broken down into several smaller page fragments for easier maintenance. A page fragment created for one page can be reused in other pages. Thus use of page fragments can also provide for reusability as well.

ADF Faces 640 also include page templates (identified in FIG. 6). A page template is a page layout definition including values for certain attributes of the page. A page template can be used to create one or more pages of a user interface, where each page inherits the defined layout of the page template. Layout modifications to a page template automatically propagate to all pages that consume the page template. A defined layout of a page template also automatically inserts and configures the correct components required to implement a desired layout look and behavior.

ADF Faces 640 also include UI components (identified in FIG. 6). UI components are components used to display a page of a user interface and corresponding data. Such UI components can include hierarchical data tables, tree menus, in-page dialogs, accordions, dividers, sortable tables, charts, graphs, gauges, and other components that help define the layout of a page of a user interface.

The framework implementation also includes JDeveloper 650. JDeveloper is a development tool used to develop source code for a user interface. The framework implementation also includes metadata services ("MDS") 660. As described above, metadata (such as an XML file) is generated by source code of an application. More specifically, structural and behavioral aspects of ADF components (such as page layouts, task flows, and business logic) are declarative described using metadata. MDS provides a common repository for the metadata generated by the source code, and also provides an administrative tool for accessing the metadata in the common repository.

Figure 7:
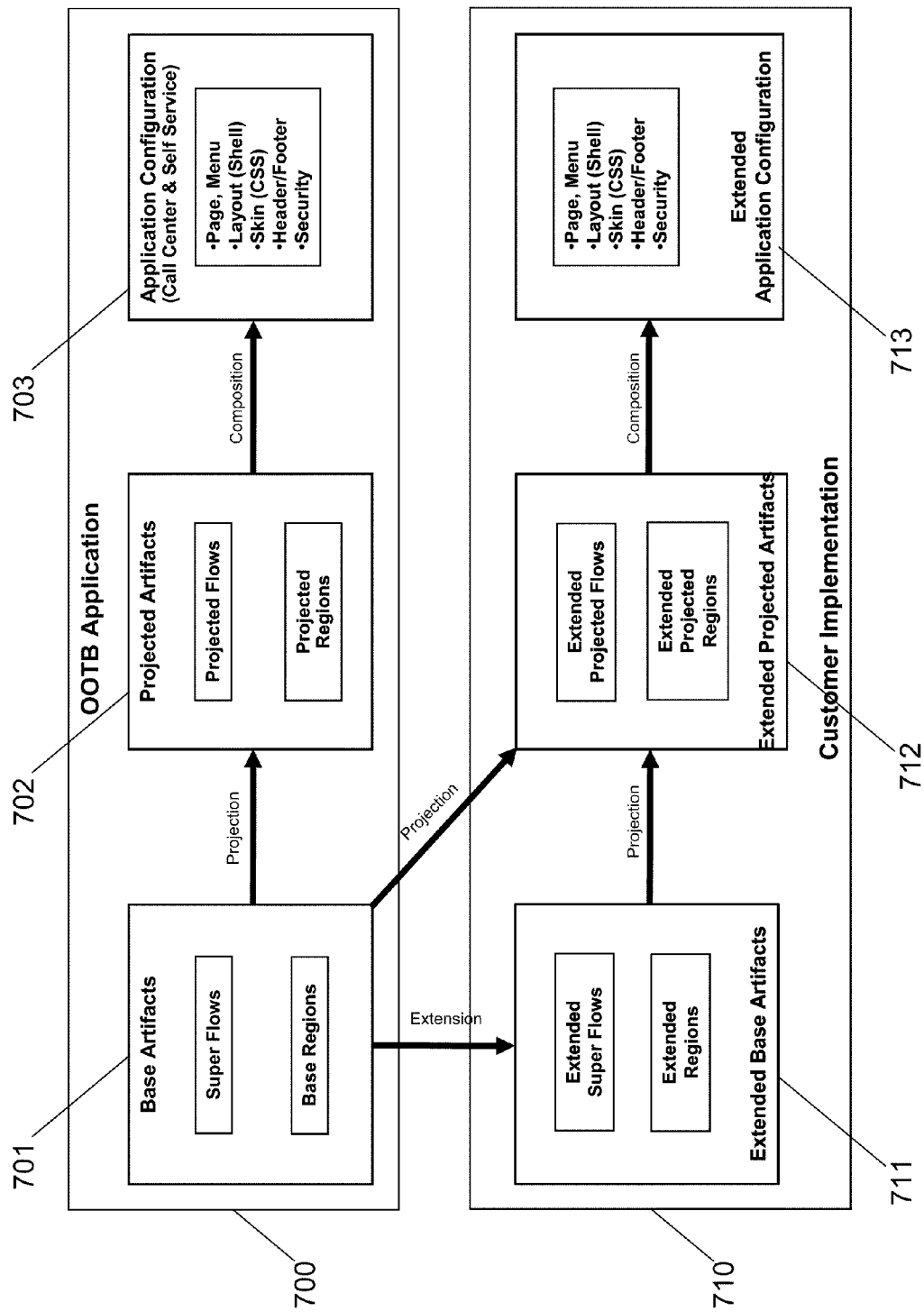
FIG. 7 illustrates customization and configuration of a user interface according to an embodiment of the invention.

FIG. 7 illustrates an example of customization and configuration of a user interface according to an embodiment of the invention. The embodiment illustrated in FIG. 7 relates to an application which includes a user interface component, in the context of what the application includes out-of-the-box ("OOTB"), and how a customer can configure the application. In the illustrated embodiment, region OOTB Application 700 represents application features that are available to a customer without any customization or configuration by the customer. Furthermore, in the illustrated embodiment, region Customer Implementation 710 represents how a customer can customize or configure the application.

OOTB Application 700 includes Base Artifacts 701, which represents artifacts, or reusable application components, which have not been customized or configured. For example, in the illustrated embodiment, Base Artifacts 701 include super-flows and base regions. A super-flow, as will be described below in more detail, is an extension of a task flow template, and includes all possible activities of any task flow which is based on the task flow template. A region, which will also be described below in more detail, is a UI component whose content is based on a bounded task flow, and represents a portion of a page viewed in a user interface. A base region is a region that has not been customized or configured for a specific flow. These artifacts are available to a customer to use, or to either customize or configure.

OOTB Application also includes Projected Artifacts 702, which include artifacts that have been configured by the vendor. As previously described, configuration is defined as the modification of an application by modifying one or more metadata files generated by the source code of the application. Thus, the artifacts of Projected Artifacts 702 have been modified by the vendor through the configuration of metadata. The artifacts have been pre-configured by the vendor, based on anticipated customer requirements, so that a customer will not be required to configure the artifacts themselves.

For example, Projected Artifacts 702 include projected flows and projected regions. Projected flows are created through a projection of corresponding super-flows, and projected regions are created through a projection of corresponding base regions. In the illustrated embodiment of FIG. 7, "projection" is the configuration of corresponding super-flows and base regions via configuration of metadata. Thus, projected flows and projected regions are task flows and regions that have been pre-configured by the vendor.

OOTB Application also includes Application Configuration 703. Application Configuration 703 represents complete user interfaces that are composed using projected flows and projected regions. The user interface is created through composition. Composition includes the implementation of one or more projected flows and projected regions, and further includes the configuration of application settings, such as page settings, menu settings, layout settings, skin settings, header/footer settings, and security settings. In the illustrated embodiment, the complete user interfaces included OOTB are the call center user interface and self service user interface. Thus, in the illustrated embodiment, these user interfaces are provided to a customer and do not require any configuration.

As previously described, the illustrated embodiment not only provides base artifacts, pre-configured artifacts, and complete user interfaces for a customer, but also allows a customer to customize and configure artifacts based on a customer's specific requirements. Such customization and configuration will now be described in relation to Customer Implementation 710.

Customer Implementation 710 includes Extended Base Artifacts 711. Extended Base Artifacts 711 include artifacts that have customized by a customer based on specific requirements. As described above, customization is defined as the modification of an application by modifying the source code of the application. If a customer has application development skills and an application development tool, a customer can customize the base artifacts provided OOTB. This customization process is identified as an "extension" in FIG. 7.

For example, Extended Base Artifacts 711 include extended super flows and extended regions. Extended super flows are super flows that have been customized by the customer for specific purposes. Extended regions are base regions that have been customized by the customer for specific purposes. While Extended Base Artifacts 711 are extended for specific purposes as compared to Base Artifacts 701, Extended Base Artifacts 711 are still relatively broad and can be configured for specific purposes (such as specific channels), as described below.

Customer Implementation 710 also includes Extended Projected Artifacts 712. Similar to Projected Artifacts 702, Extended Projected Artifacts 712 include artifacts that have been configured for specific purposes. However, as seen in FIG. 7, Extended Projected Artifacts 712 can be created by one of two processes. In the first process, similar to Projected Artifacts 702, Extended Projected Artifacts 712 can be projected from Base Artifacts 701. However, unlike Projected Artifacts 702, Extended Projected Artifacts 712 are configured by the customer, rather than the vendor. In the second process, Base Artifacts 701 are first extended to create Extended Base Artifacts 711, and then Extended Base Artifacts 711, rather than Base Artifacts 701, are projected to create Extended Projected Artifacts 712. In either process, projection is accomplished through configuration of the metadata.

For example, Extended Projected Artifacts 712 include extended projected flows and extended projected regions. Extended projected flows are created either through a projection of super flows, or a projection of extended super flows. Likewise, extended projected regions are created either through a projection of base regions or a projection of extended regions.

Customer Implementation 710 also includes Extended Application Configuration 713. Similar to Application Configuration 703, Extended Application Configuration 713 represents complete user interfaces. However, the user interfaces are composed using extended projected flows and extended projected regions, rather than projected flows and projected regions. Similar to Application Configuration 703, the user interfaces are created through composition. Composition includes the implementation of one or more projected flows and projected regions, and further includes the configuration of application settings, such as page settings, menu settings, layout settings, skin settings, header/footer settings, and security settings. In the illustrated embodiment, the complete user interface can be a user interface configured for a specific purpose, such as for a specific channel.

Figure 8:
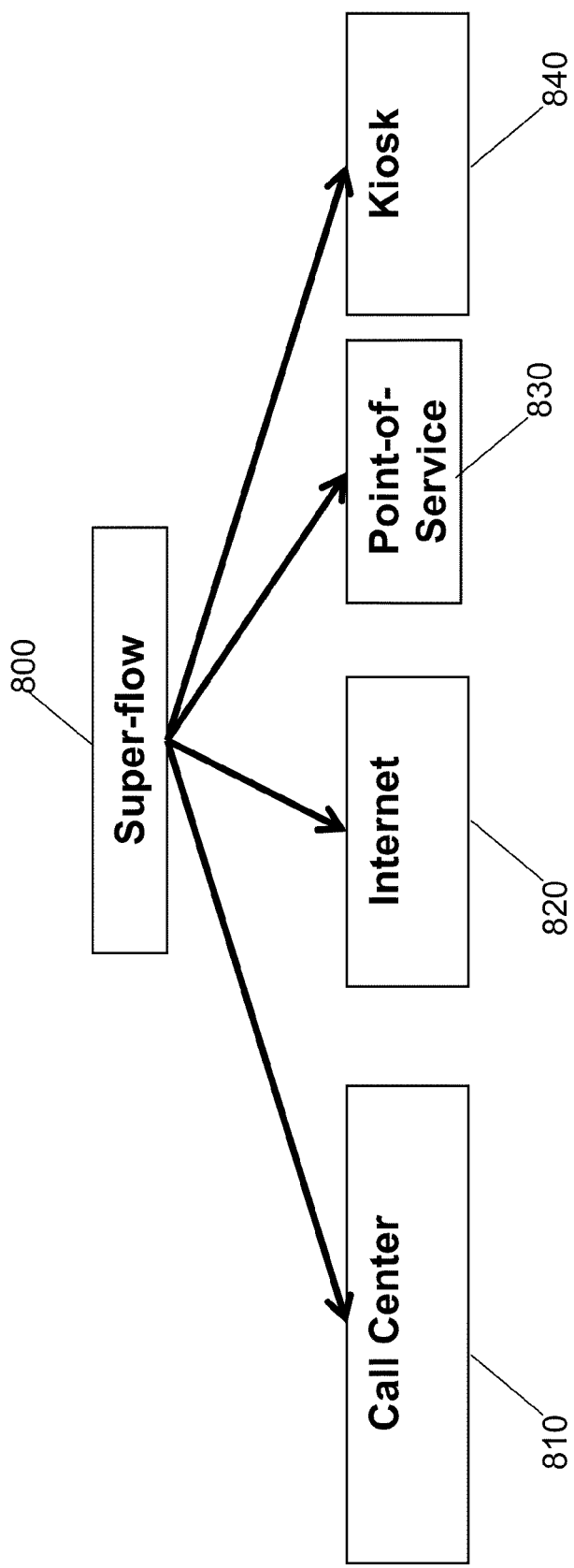
FIG. 8 illustrates configuring a flow of a user interface using a projection technique according to an embodiment of the invention.

FIG. 8 illustrates an example of configuring a flow of a user interface using a projection technique according to an embodiment of the invention. As described above, Flow configuration relates to how the different pages of the user interface are tied together, through the configuration of a flow of the user interface. Flow configuration can involve a super-flow. A super-flow is an extension of a task flow template, and includes all possible activities of any task flow that is based off the task flow template. For example, given a group which includes task flows A, B, and C, where task flow A includes activities 1, 2, 3, and 4, task flow B includes activities 4, 5, 6, and 7, and task flow C includes activities 7, 8, 9, and 10, a super-flow for task flows A, B, and C, is a task flow template which includes activities 1-10. Therefore, a super-flow is a broad task flow template which can be configured into multiple specific task flows.

Projection is a technique of sub-setting a super-flow into one or more sub-flows. Each sub-flow is configured for specific requirements, such as specific channel requirements. In the illustrated embodiment, super-flow 800 represents a super-flow which includes all possible activities of a task flow, for any channel implementation of the task flow. As illustrated in FIG. 8, super-flow 800 is projected into four sub-flows, where each sub-flow is configured for a specific channel. Specifically, super-flow is projected into a sub-flow configured for a call center (identified in FIG. 8 as call center 810), a sub-flow configured for an Internet channel (identified in FIG. 8 as Internet 620), a sub-flow configured for a POS channel (identified in FIG. 8 as Point-of-Service 830), and a sub-flow configured for a kiosk channel (identified in FIG. 8 as Kiosk 840). Each sub-flow will include some or all of the possible activities of the task flow, based on channel-specific requirements.

Figure 9:
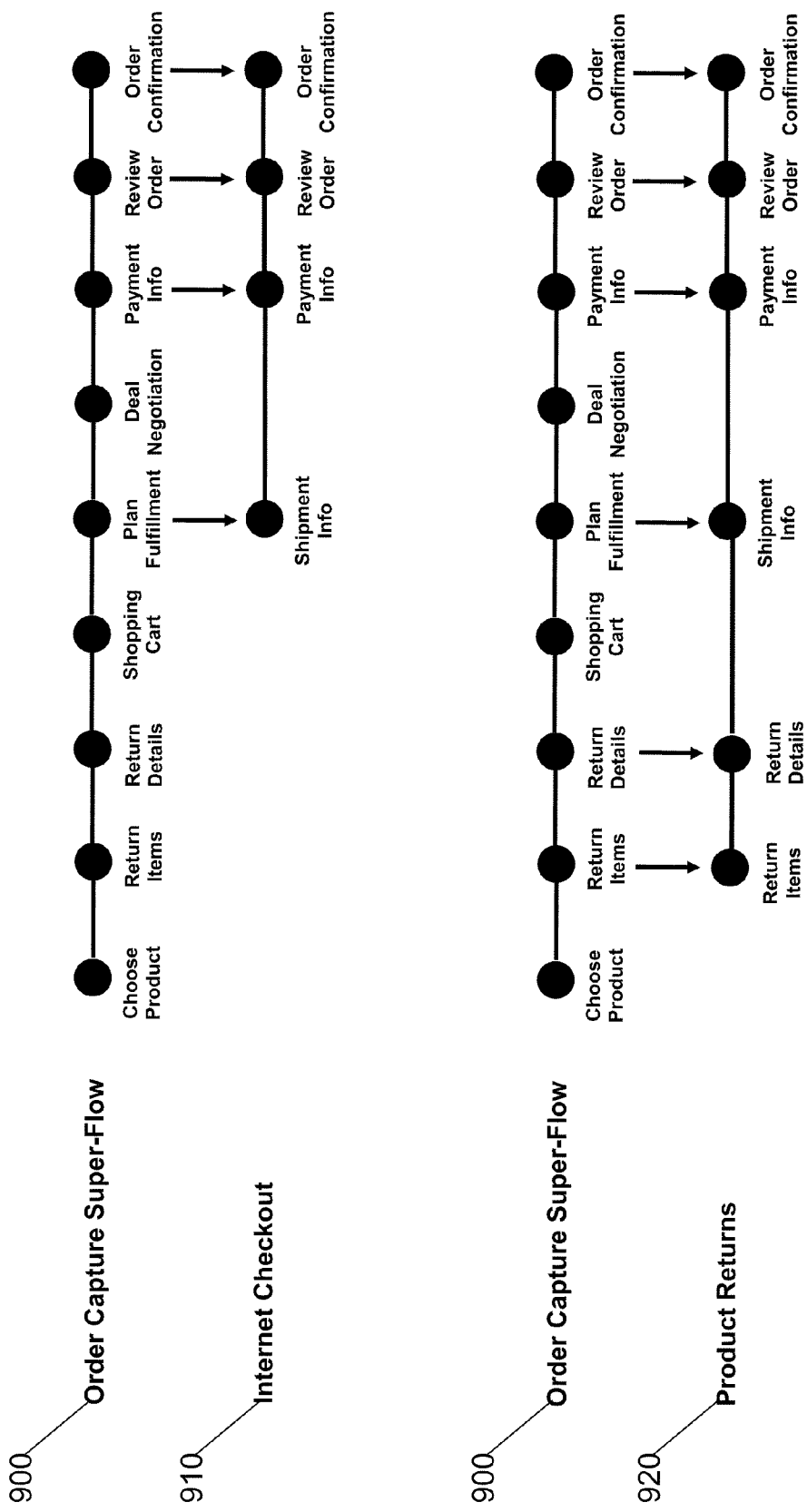
FIG. 9 illustrates an example of a projection technique according to an embodiment of the invention.

FIG. 9 illustrates an example of a projection technique according to an embodiment of the invention. FIG. 9 includes a super-flow for an order capture user interface, Order Capture Super-Flow 900. Order Capture Super-Flow 900 is a task flow template which includes the following activities: Choose Product, Return Items, Return Details, Shopping Cart, Plan Fulfillment, Deal Negotiation, Payment Info, Review Order, and Order Confirmation.

As illustrated in FIG. 9, Order Capture Super Flow 900 is projected for two channels: Internet Checkout and Product Returns. Thus, Order Capture Super Flow is projected into two different task flows: Internet Checkout 910 and Product Returns 920. For each projected task flow, different activities of Order Capture Super Flow 900 are exposed, and different activities of Order Capture Super Flow 900 are suppressed. More specifically, for projected flow Internet Checkout 910, activities Choose Product, Return Items, Return Details, Shopping Cart, and Deal Negotiation are suppressed, and activities Plan Fulfillment, Payment Info, Review Order, and Order Confirmation are exposed. For projected flow Product Returns 920, activities Choose Product, Shopping Cart, and Deal Negotiation are suppressed, and activities Return Items, Return Details, Plan Fulfillment, Payment Info, Review Order, and Order Confirmation are exposed. As illustrated in FIG. 9, the name of each activity of a super flow can be changed through projection. For example, the name of activity Plan Fulfillment of Order Capture Super Flow 900 is changed to the name Shipment Info for projected flows Internet Checkout 910 and Product Returns 920.

Figure 10:
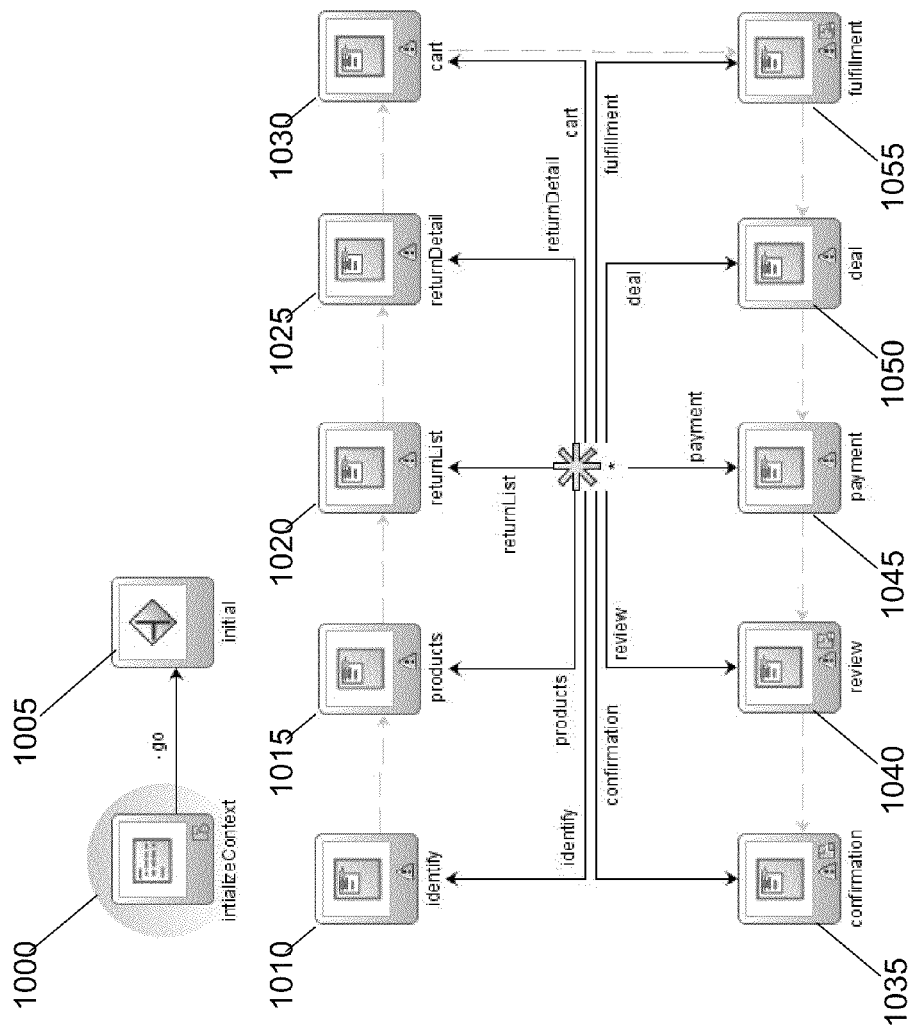
FIG. 10 illustrates an example of a super-flow according to an embodiment of the invention.

FIG. 10 illustrates an example of a super-flow according to an embodiment of the invention. As described above, a super-flow is an extension of a task flow template, and includes all possible activities of any task flow based on the task flow template. An activity represents a simple logical operation, such as displaying a page, executing application logic, or calling another task flow.

The super-flow illustrated in FIG. 10 includes two initial activities initializeContext 1000 and initial 1005 which initialize application data. The super-flow further includes the following activities with represent the core activities of the super-flow: identify 1010, products 1015, returnList 1020, returnDetail 1025, cart 1030, confirmation 1035, review 1040, payment 1045, deal 1050, and fulfillment 1055. As illustrated in FIG. 10, the core activities are arranged in a star-shaped diagram which represents a process flow of the super-flow. The process starts at identify 1010, when the identify activity is performed based on corresponding source code. A condition is then evaluated which determines which activity is performed next in the process flow based on corresponding metadata. If the corresponding metadata is configured to cause the condition to indicate that products 1015 should be performed after identify 1010, then the process flows to products 1015. However, if the corresponding metadata is configured to cause the condition to indicate that another activity should be performed (such as return list 1020), then the process flows to returnList 1020, skipping products 1015. In this manner, the corresponding metadata can be configured to determine which activities are exposed in a task flow, and which activities are suppressed. This configuration can be done without modifying any of the source code that underlies the core activities.

Figure 11:
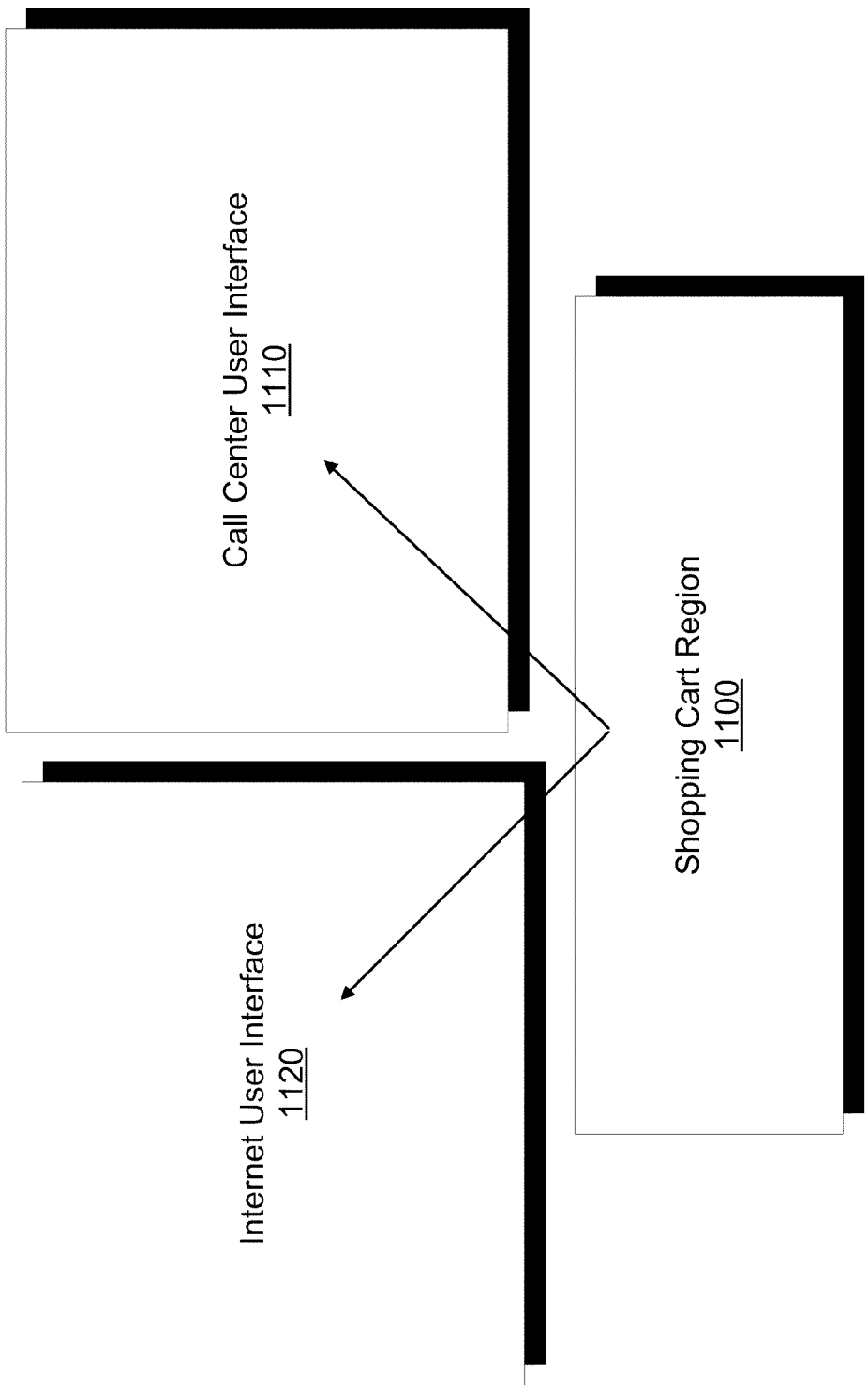
FIG. 11 illustrates an example of configuring a region of a user interface according to an embodiment of the invention.

FIG. 11 illustrates an example of configuring a region of a user interface according to an embodiment of the invention. As discussed above, region configuration relates to the appearance and functionality of each page of the user interface. As also discussed above, a region is a UI component whose content is based on a bounded task flow, and represents a portion of a page viewed in a user interface. A region drives the presentation of a bounded task flow as it executes on a page of the user interface. In a more complicated region, the bounded task flow may include a series of activities. A user may view each page fragment contained in the bounded task flow one after another. A user can navigate the page fragments using a control object located on each page fragment.

As illustrated in FIG. 11, shopping cart region 1100 represents a region for a shopping cart. As also illustrated in FIG. 11, user interface 1110 represents a user interface which includes a shopping cart region based on shopping cart region 1100, but configured for a call center channel. Furthermore, as illustrated in FIG. 11, user interface 1120 represents a user interface which includes a shopping cart region based on shopping cart region 1100, but is configured for an Internet channel rather than a call center channel.

FIG. 12 illustrates shopping cart region 1100 of FIG. 11 according to an embodiment of the invention. In the illustrated embodiment, shopping cart region 1100 can be a common shopping cart region for all user interface channels and can display fields such as product, product information, quantity, unit of measure ("UOM"), asset, unit net price, total net price, status, and alert.

Figure 13:
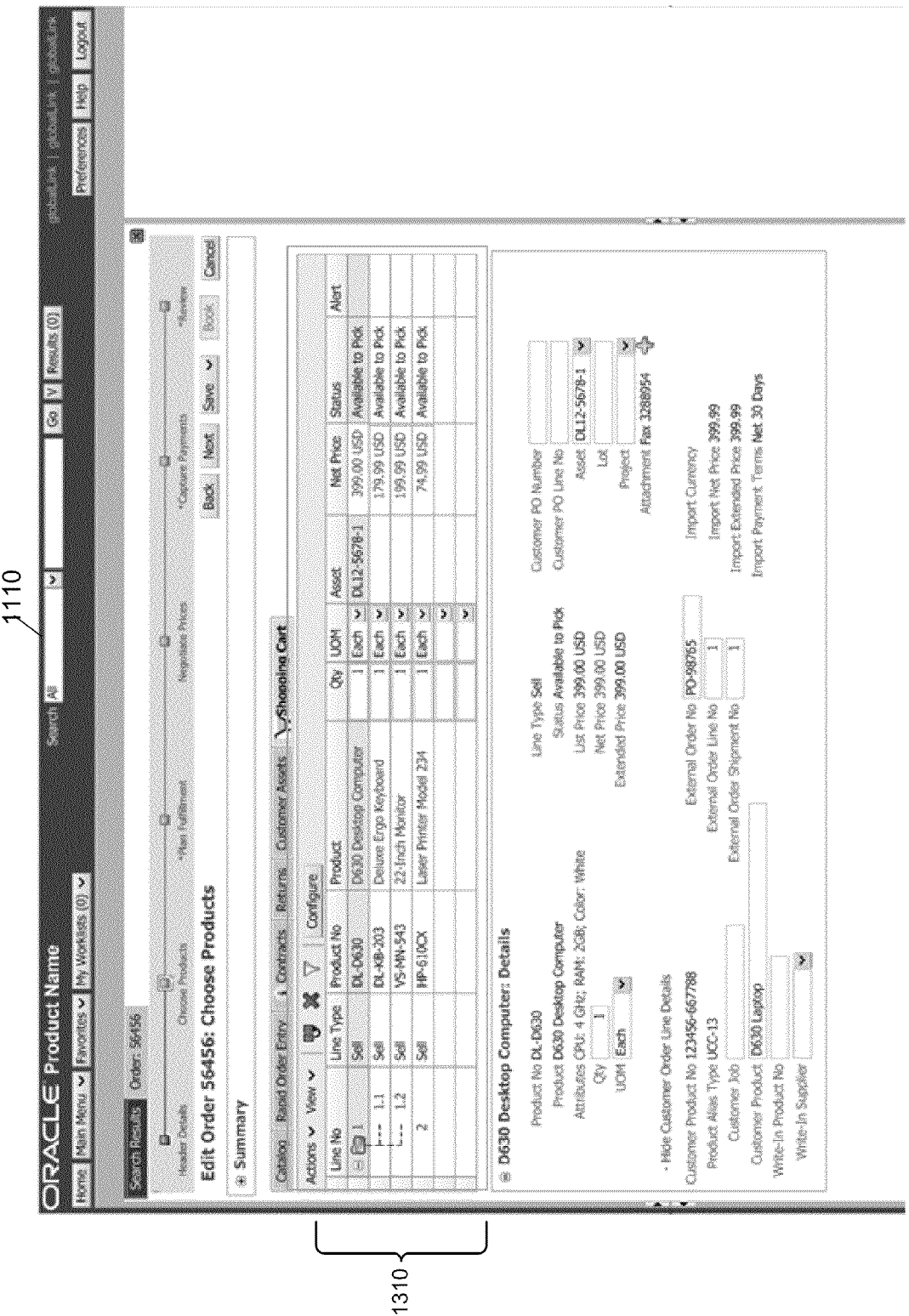
FIG. 13 illustrates a user interface of FIG. 11 with a configured region according to an embodiment of the invention.

FIG. 13 illustrates user interface 1110 of FIG. 11 according to an embodiment of the invention. As illustrated in FIG. 13, shopping cart region 1310 of user interface 1110 differs in appearance from shopping cart region 1100 of FIG. 12. Specifically, in shopping cart region 1310 of user interface 1110, the product image field is not displayed for each record displayed in the shopping cart, and the unit net price and total net price fields has been replaced with a net price field. Additionally, the total space for each record is smaller in shopping cart region 1310 of user interface 1110 than the total space for each record in shopping cart region 1100 of FIG. 12.

Figure 14:
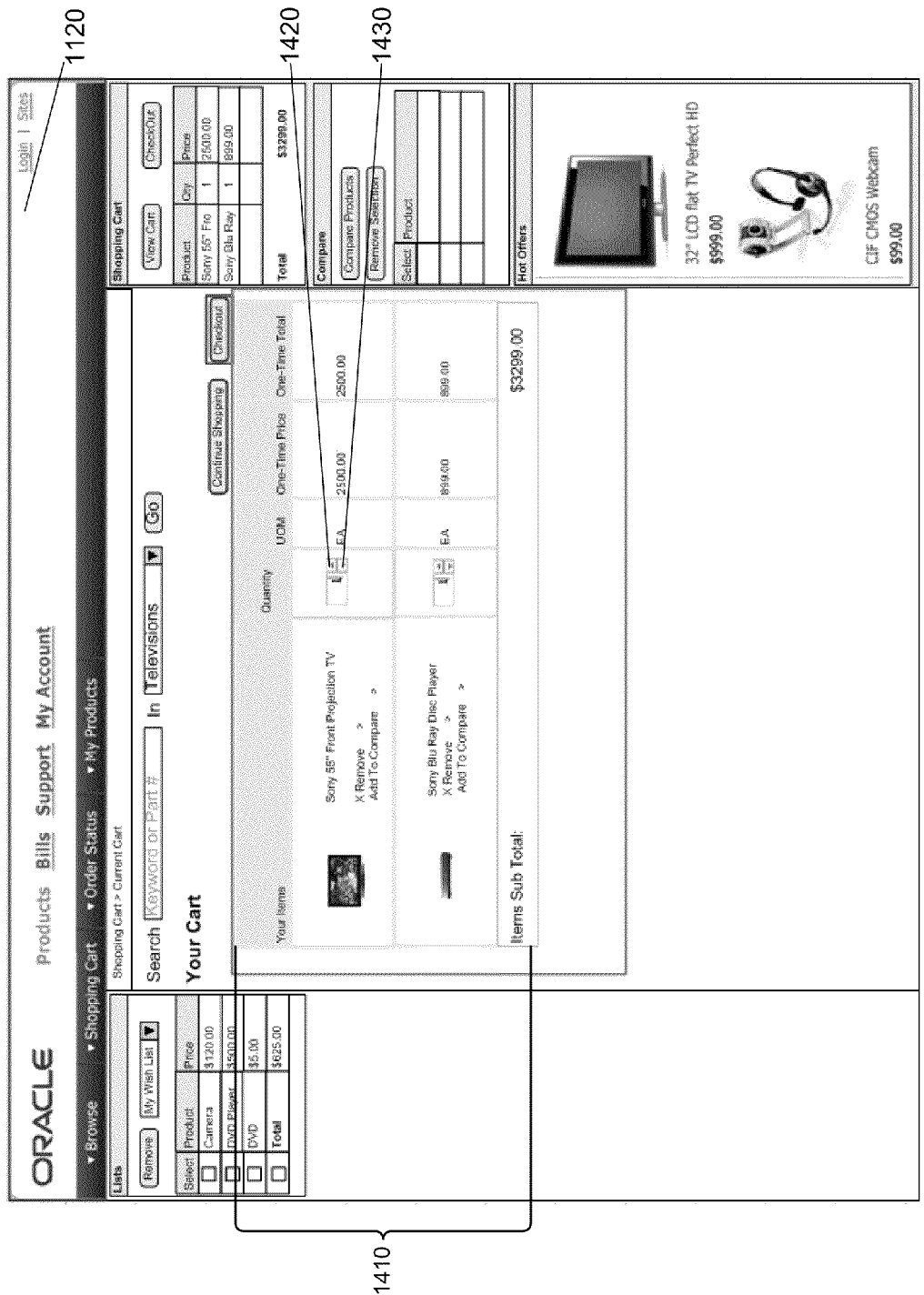
FIG. 14 illustrates another user interface of FIG. 11 with a configured region according to an embodiment of the invention.

FIG. 14 illustrates user interface 1120 of FIG. 11. As illustrated in FIG. 14, shopping cart region 1410 of user interface 1120 differs in appearance from shopping cart region 1100 of FIG. 12. However, shopping cart region 1410 of user interface 1120 also differs in appearance from shopping cart region 1310 of user interface 1110. For example, the data corresponding to the product and product image fields in shopping cart region 1100 of FIG. 12 are displayed in a single field in shopping cart region 1410 of user interface 1120, identified as "Your Items." Furthermore, in shopping cart region 1410 of user interface 1120, in addition to displaying a value for the quantity field, shopping cart region 1410 also displays buttons 1420 and 1430 for each record. Button 1420 displays an up arrow and allows the user to increase the quantity by a fixed amount. Button 1430 displays a down arrow and allows the user to decrease the quantity by a fixed amount. In addition, shopping cart region 1410 of user interface 1120 replaces the unit net price and total net price fields with one-time price and one-time total fields, and does not display the asset, status, and alert fields of shopping cart region 1100 of FIG. 12.

Figure 15:
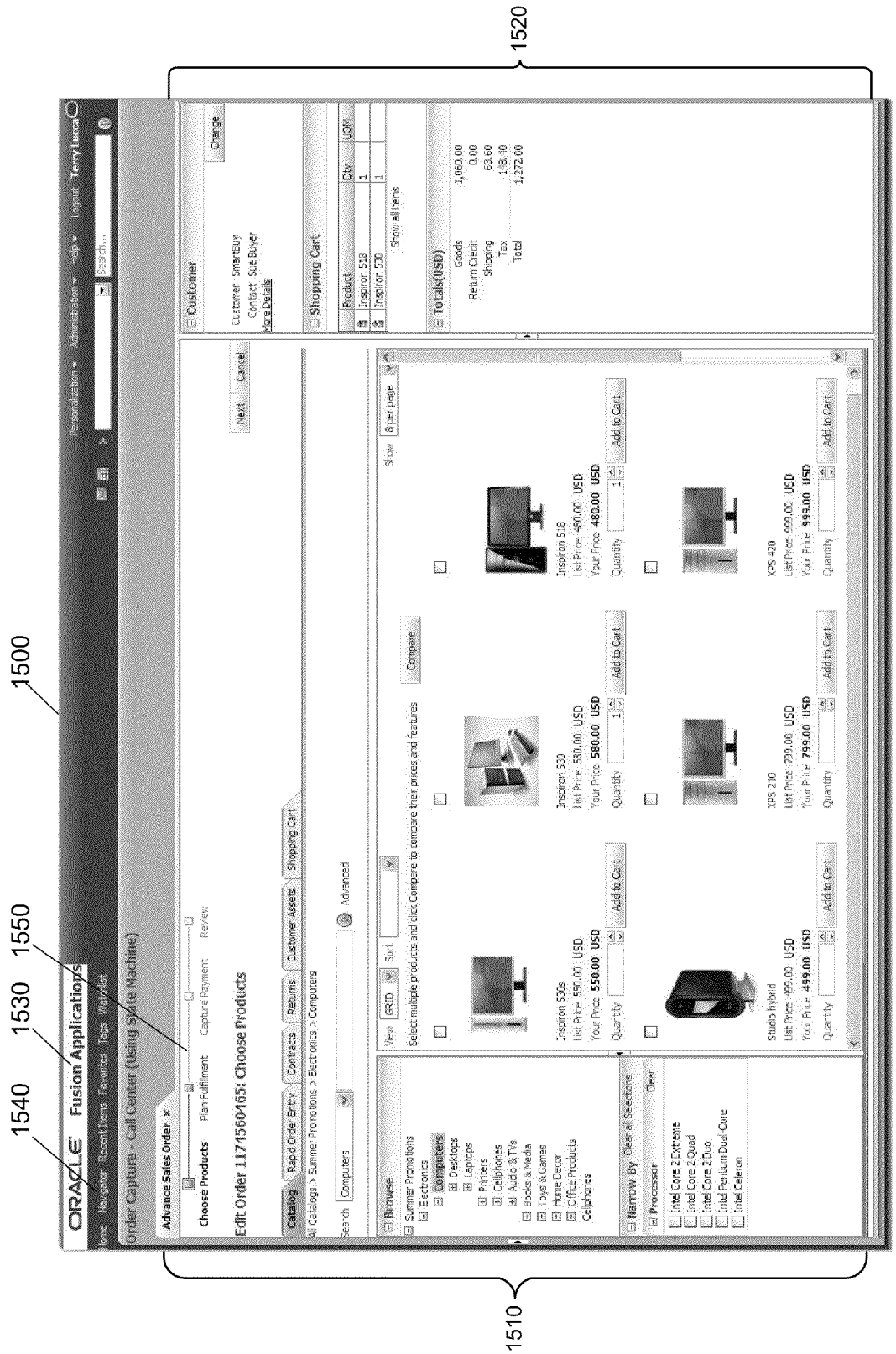
FIG. 15 illustrates configuring an application of a user interface according to an embodiment of the invention.

FIG. 15 illustrates a user interface application configuration according to an embodiment of the invention. As described above, application configuration relates to an overall appearance of the entire user interface, as opposed to a specific page of the user interface. User interface 1500 represents an order capture user interface configured for a call center channel. According to an application configuration, user interface 1500 includes two columns, columns 1510 and 1520. User interface 1500 also includes header 1530, which identifies the product, and menu 1540, which includes options such as "Home," "Navigator," "Recent Items," "Favorites," "Tags," and "Watchlist." User interface 1500 also includes train component 1550. As previously described, t train component is an indication of a number of steps in a multistep process, and an indication of a current step in relation to the entire process. Train component 1550 indicates that that the process includes the steps, "Choose Products," "Plan Fulfillment," "Capture Payment," and "Review." Train component 1550 further indicates that the current step is "Choose Products," and that the current step is the first step in the process.

Figure 16:
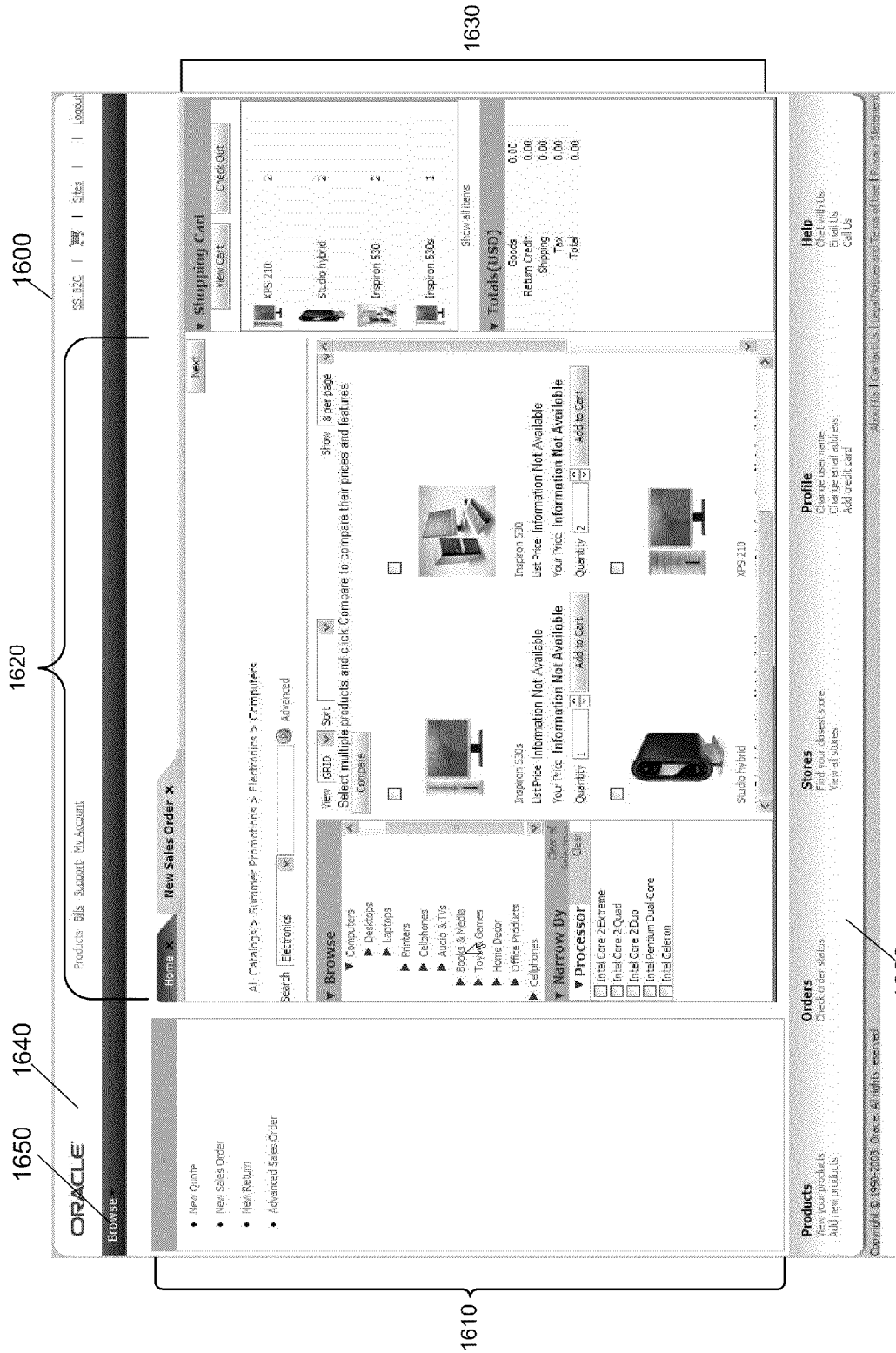
FIG. 16 illustrates configuring an application of a user interface according to an embodiment of the invention.

FIG. 16 illustrates another example of a user interface application configuration according to an embodiment of the invention. User interface 1600 represents an order capture user interface configured for an Internet channel. While user interface 1600 is based on the same source code as user interface 1500, there are significant differences in appearance between user interface 1600 and user interface 1500. For example, user interface 1600 includes three columns, columns 1610, 1620, and 1630, as opposed to the two columns displayed in user interface 1500. Furthermore, user interface 1600 includes header 1640, which has a different appearance as compared to header 1530 of user interface 1500, menu 1650, which also has a different appearance as compared to menu 1540, and footer 1660 which is not present in user interface 1500. Additionally, in contrast to user interface 1500, user interface 1600 does not display a train component. In addition, while specific appearance differences have been described as an example, many other differences in appearance between user interface 1500 and user interface 1600 exist as illustrated in FIGS. 15 and 16.

Figure 17:
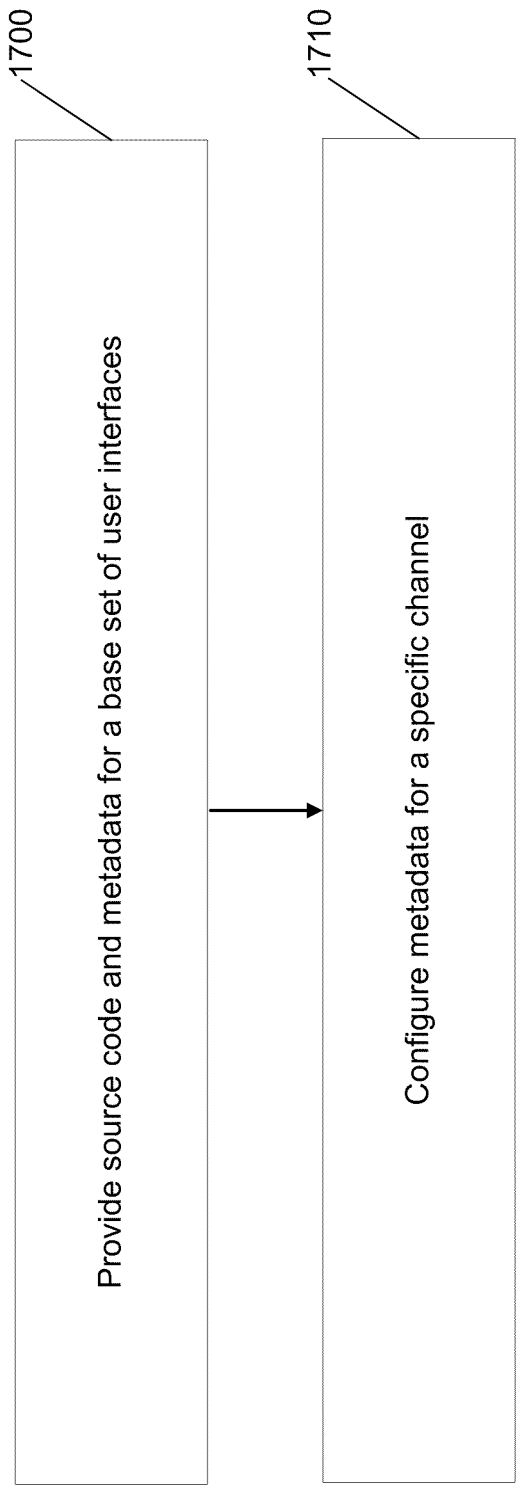
FIG. 17 illustrates a method for providing a multi-channel user interface according to another embodiment of the invention.
Figure 18:
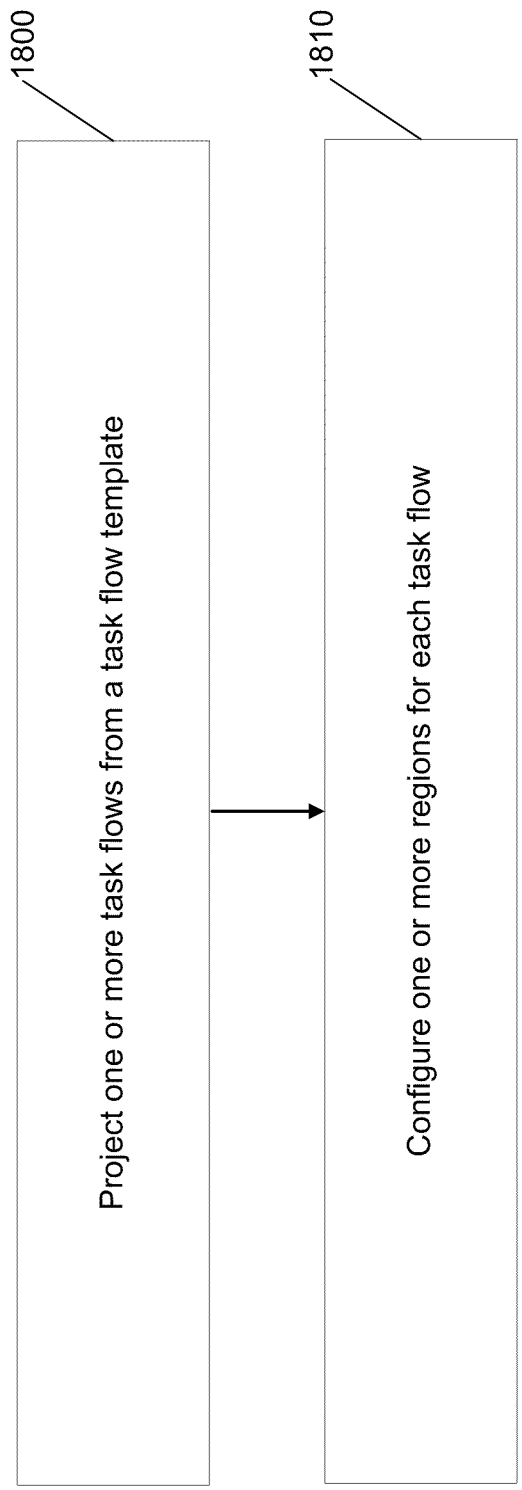
FIG. 18 illustrates a method for configuring a user interface for a specific channel according to an embodiment of the invention.

FIG. 17 illustrates a method for configuring a channel-specific user interface according to an embodiment of the invention. In one embodiment, the functionality of the flow diagram of FIG. 17, and FIG. 18, is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1700, source code and metadata for a base set of user interfaces is provided. The base set of user interfaces is capable of being executed on multiple channels. In one embodiment, the base set of user interfaces can be directed to a single product. As an example, the base set of user interfaces can include an order capture user interface or a commerce user interface. At 1710, the metadata is configured for a specific channel. In an embodiment, the configuration of the metadata can provide one or more user interfaces configured for a specific channel.

FIG. 18 illustrates a method for configuring a user interface for a specific channel according to an embodiment of the invention. In the embodiment, the user interface includes a task flow template. At 1800, one or more task flows are projected from a task flow template. In an embodiment, a task flow template includes one or more activities, and a task flow that is projected from the task flow template can expose one, some, or all the activities of the task flow template. At 1810, one or more regions are configured for each task flow. Based on the projected task flows, and configured regions, a user interface can be configured for a specific channel.

Thus, according to an embodiment of the invention, a single set of base user interfaces can be provided, where each base user interface can be configured for a specific channel. Thus, instead of having to develop multiple user interfaces for a single product, where each user interface corresponds to a specific channel, a vendor can create a single base user interface and configure the user interface for each channel as needed. Furthermore, as a vendor develops a new feature for a user interface, the vendor only needs to customize the source code once in the base user interface, which can then be configured for each specific channel, rather than customize the source code in multiple user interfaces.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to customize and configure a user interface, the customizing and configuring comprising:
   providing source code and metadata for a base set of user interfaces, wherein the base set of user interfaces is executed on multiple channels;
   configuring the metadata for a specific channel;
   projecting, for the specific channel, one or more task flows from a task flow template that comprises a set of control flow rules that control navigation of the user interface by sub-setting the task flow template into the one or more task flows, wherein each task flow comprises a subset of the control flow rules, and wherein each task flow is configured for the specific channel; and
   projecting, for the specific channel, one or more regions from a base region, wherein a region comprises a user interface component that controls an appearance and a functionality of at least a portion of a page of the user interface, wherein each region is configured for the specific channel, and wherein each region differs in appearance and functionality from the base region.

2. The non-transitory computer-readable medium of claim 1, wherein the configuration of metadata further comprises configuring at least one of, page settings, menu settings, layout settings, skin settings, header/footer settings, and security settings.

3. The non-transitory computer-readable medium of claim 1, wherein the providing source code and metadata for the base set of user interfaces further comprises providing pre-configured task flows and pre-configured regions for each task flow.

4. The non-transitory computer-readable medium of claim 1, wherein the source code is customized for a specific channel.

5. The non-transitory computer-readable medium of claim 1, wherein the projecting one or more task flows from a task flow template further comprises exposing one or more activities of the task flow template.

6. The non-transitory computer-readable medium of claim 5, wherein the projecting one or more task flows from a task flow template further comprises suppressing one or more activities of the task flow template.

7. The non-transitory computer-readable medium of claim 1, wherein the task flow template, the one or more task flows, and the one or more regions are each implemented in an Oracle Application Development Framework.

8. A computer-implemented method, comprising:
   providing source code and metadata for a base set of user interfaces, wherein the base set of user interfaces is executed on multiple channels;
   configuring the metadata for a specific channel;
   projecting, for the specific channel, one or more task flows from a task flow template that comprises a set of control flow rules that control navigation of a user interface by sub-setting the task flow template into the one or more task flows, wherein each task flow comprises a subset of the control flow rules, and wherein each task flow is configured for the specific channel; and
   projecting, for the specific channel, one or more regions from a base region, wherein a region comprises a user interface component that controls an appearance and a functionality of at least a portion of a page of the user interface, wherein each region is configured for the specific channel, and wherein each region differs in appearance and functionality from the base region.

9. The computer-implemented method of claim 8, wherein the configuration of metadata further comprises configuring at least one of, page settings, menu settings, layout settings, skin settings, header/footer settings, and security settings.

10. The computer-implemented method of claim 8, wherein the providing source code and metadata for the base set of user interfaces further comprises providing pre-configured task flows and pre-configured regions for each task flow.

11. The computer-implemented method of claim 8, wherein the source code is customized for a specific channel.

12. The computer-implemented method of claim 8, wherein projecting one or more task flows from a task flow template further comprises exposing one or more activities of the task flow template.

13. A multi-channel user interface system, comprising:
a memory configured to store instructions; and
a processor configured to execute the instructions stored on the memory;
wherein the processor is further configured, when executing the instructions stored on the memory, to provide source code and metadata for a base set of user interfaces, wherein the base set of user interfaces is executed on multiple channels;
wherein the processor is further configured, when executing the instructions stored on the memory, to configure the metadata for a specific channel;
wherein the processor is further configured, when executing the instructions stored on the memory, to project one or more task flows from a task flow template that comprises a set of control flow rules that control navigation of a user interface by sub-setting the task flow template into the one or more task flows, wherein each task flow comprises a subset of the control flow rules, and wherein each task flow is configured for the specific channel; and
wherein the processor is further configured, when executing the instructions stored on the memory, to project, for the specific channel, one or more regions from a base region, wherein a region comprises a user interface component that controls an appearance and a functionality of at least a portion of a page of the user interface, wherein each region is configured for the specific channel, and wherein each region differs in appearance and functionality from the base region.

14. The multi-channel user interface system of claim 13, wherein the processor is further configured, when executing the instructions stored on the memory, to configure at least one of, page settings, menu settings, layout settings, skin settings, header/footer settings, and security settings.

15. The multi-channel user interface system of claim 13, wherein the processor is further configured, when executing the instructions stored on the memory, to provide pre-configured task flows and pre-configured regions for each task flow.

16. The multi-channel user interface system of claim 13, wherein the source code is customized for a specific channel.

17. The multi-channel user interface system of claim 13, wherein the processor is further configured, when executing the instructions stored on the memory, to expose one or more activities of the task flow template.

* * * * *

UNITED STATES PATENT AND TRADEMARK OFFICE
CERTIFICATE OF CORRECTION

PATENT NO.       : 8,689,110 B2
APPLICATION NO.  : 12/756670
DATED            : April 1, 2014
INVENTOR(S)      : Verma et al.

It is certified that error appears in the above-identified patent and that said Letters Patent is hereby corrected as shown below:

On the title page, column 1, under Inventors, line 2, delete "Emerals Hills, CA (US);" and insert
-- Emerald Hills, CA (US); --, therefor.

On title page 2, column 2, under Other Publications, line 2, delete "Feaures/." and insert
-- Features/. --, therefor.

In the Specification

In column 14, line 40, after "that" delete "that".

Signed and Sealed this
Twenty-third Day of September, 2014

Michelle K. Lee
*Deputy Director of the United States Patent and Trademark Office*